(12) United States Patent
Vican

(10) Patent No.: US 7,503,622 B2
(45) Date of Patent: Mar. 17, 2009

(54) TUBULAR INSTRUMENT PANEL SUPPORT STRUCTURE

(75) Inventor: Rudy M. Vican, Oxford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 8 days.

(21) Appl. No.: 11/467,180

(22) Filed: Aug. 25, 2006

(65) Prior Publication Data

US 2008/0048470 A1 Feb. 28, 2008

(51) Int. Cl.
*B62D 25/14* (2006.01)
(52) U.S. Cl. .................... 296/190.03; 296/70
(58) Field of Classification Search ............ 296/70, 296/72, 193.02, 190.03; 180/90
See application file for complete search history.

(56) References Cited

U.S. PATENT DOCUMENTS

| | | | |
|---|---|---|---|
| 5,931,520 A * | 8/1999 | Seksaria et al. | 296/70 |
| 6,176,544 B1 * | 1/2001 | Seksaria et al. | 296/203.02 |
| 6,213,504 B1 * | 4/2001 | Isano et al. | 280/748 |
| 6,391,470 B1 * | 5/2002 | Schmieder et al. | 428/598 |
| 6,932,410 B2 * | 8/2005 | DeLong et al. | 296/72 |
| 6,988,764 B2 * | 1/2006 | Matsutani | 296/193.02 |
| 2006/0199492 A1 * | 9/2006 | Ozeki | 454/69 |

* cited by examiner

*Primary Examiner*—Dennis H Pedder

(57) ABSTRACT

A tubular instrument panel support structure is provided. The structure includes a plurality of support tubes aligned substantially end-to-end and extending laterally to span the width of a vehicle body for the support of various instruments and devices within the panel. A plurality of brackets and braces are welded or attached to the support tubes and extend radially outward therefrom to define various areas within the instrument panel such as a driver-side, console-side, and passenger-side. The lateral support tubes are connected to and separated into segments by a plate or plates, and each tube segment having a different configuration or gauge thickness suitable to the unique forces born by each segment. The lateral support tubes are operatively connected to a vehicle hinge pillar to thereby provide substantially rigid lateral support to the instrument panel.

16 Claims, 3 Drawing Sheets

TUBULAR INSTRUMENT PANEL SUPPORT STRUCTURE

TECHNICAL FIELD

The present invention relates to a vehicular instrument panel support structure having a plurality of support tubes spanning the width of a vehicle body.

BACKGROUND OF THE INVENTION

Instrument panels, alternately referred to as dashboards, are situated within a passenger compartment of a vehicle and positioned facing the vehicle occupants, primarily a driver/operator, for easy readability and accessibility of the various instruments housed within the instrument panel. Common instrumentation found in a vehicle passenger compartment includes, for example, speedometers, odometers, tachometers, fuel gauges, and indicator lamps. An instrument panel may also house such other non-metering devices as air bags, glove compartments or boxes, radios, CD/DVD/cassette players, navigation screens, clocks, ashtrays, speakers, climate controls, and air vents. Instrument panels are typically formed with protective padding and other external trim material which is contoured and styled to provide a fully-assembled instrument panel with an aesthetically-pleasing appearance. Instrument gauges and meters are typically faced with a transparent material for protection from damage, dirt, and/or tampering.

Since the aforementioned instruments and devices may contribute a substantial amount of combined weight and mass to the vehicle, the instrument panel is therefore supported by a substantially rigid substructure positioned behind and beneath the visible portions of the panel. Instrument panel support structures are often constructed from stamped and welded steel sheet metal assemblies and may include a plurality of supporting brackets or braces having a sufficient amount of surface area to allow the support structure to be attached to the vehicle and the instruments and other devices to be securely fastened within the panel.

SUMMARY OF THE INVENTION

Accordingly, a tubular instrument panel support structure is provided for use within a vehicle, wherein two lateral support tubes each having a plurality of support brackets are aligned substantially end-to-end and operatively connected to a mid-plate to span the width of a vehicle body, thereby providing adequate support for an adjoining instrument panel.

In accordance with one aspect of the invention, each section of lateral support tubing may be specially configured to provide an appropriate level of support for the unique forces born by that section.

In accordance with another aspect of the invention, two steel plates are used to divide the instrument panel support structure into three tube segments, wherein the space formed between the two plates defines a separate instrumentation console area.

In accordance with another aspect of the invention, a vehicle body assembly has a pair of hinge pillar assemblies and an instrument panel support structure operatively connected on either end to the respective hinge pillar assemblies, the structure further having a plurality of lateral support tubes aligned substantially end-to-end with at least one plate operatively connected between the lateral support tubes, wherein the support tubes each have support brackets extending radially therefrom.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
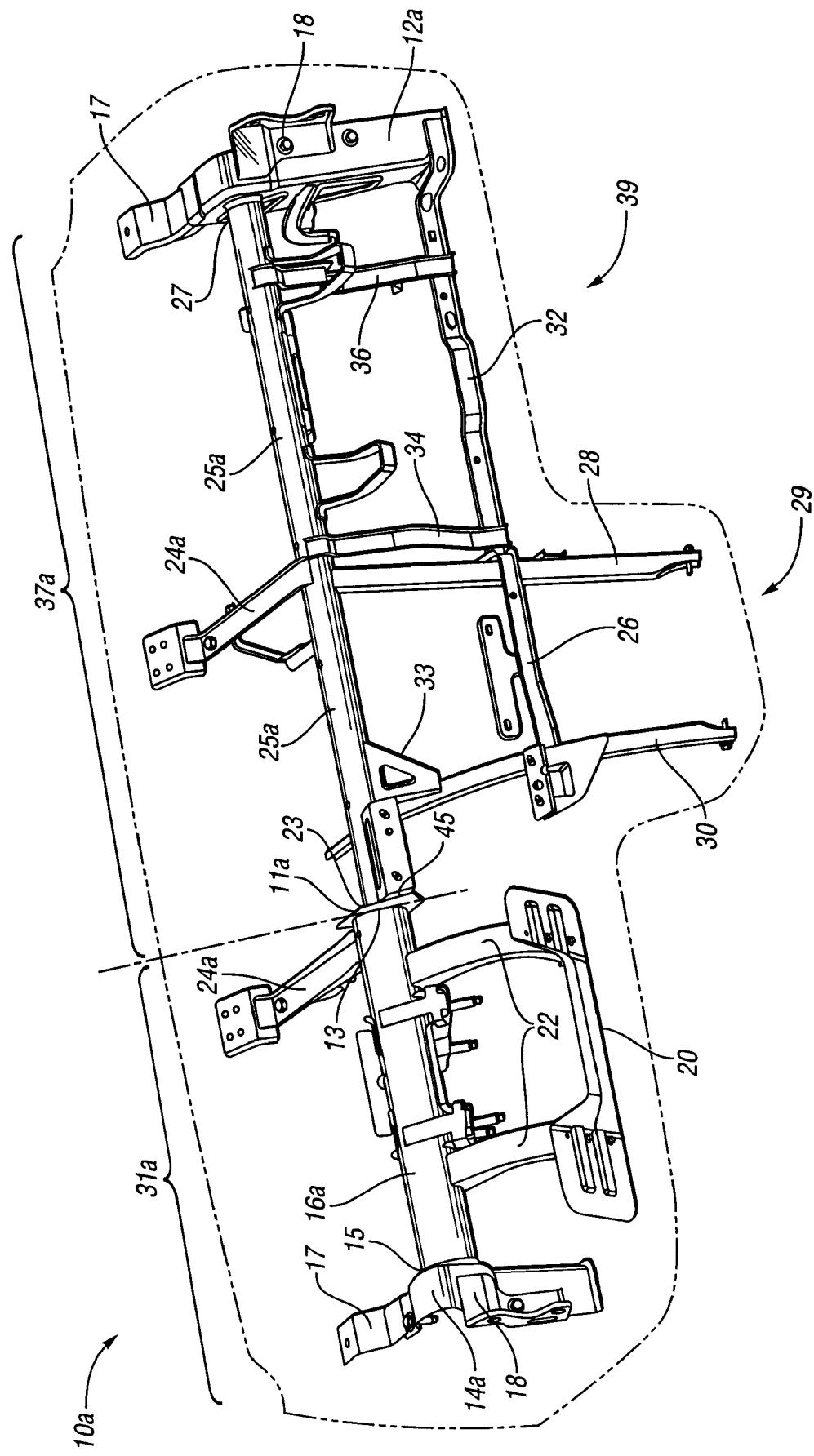
FIG. 1 is a perspective illustration of an instrument panel support structure according to the present invention.

Referring to the drawings wherein like reference numbers correspond to like or similar components throughout the several figures, there is shown in FIG. 1 a tubular instrument panel support structure 10a according to the invention. Support structure 10a includes a driver-side 31a and passenger-side 37a. Driver-side 31a has a driver-side pipe or tube 16a. Passenger-side 37a has a passenger-side pipe or tube 25a, with tubes 16a, 25a being separated by and attached to a rigid mid-plate 11a, preferably constructed of a weldable stamped steel plate. In the preferred embodiment, the cross-sectional areas of tubes 16a, 25a are circular, although tubes with rectangular, triangular, or other suitable shapes may be also used depending on the application.

Because tubes 16a, 25a are separate components, the configurations, i.e. the respective diameters and gauge thicknesses, of tubes 16a, 25a may be customized to match their respective load requirements simply by selecting and welding appropriately-sized and positioned tubes 16a, 25a to either side of mid-plate 11a. This customizable feature provides flexibility in instrument panel design and affords an opportunity to reduce unnecessary vehicle weight. For example, the driver-side 31a of support structure 10a may require a relatively large diameter driver-side tube 16a in order to support a steering column (not shown) and additional steering column-related brackets to further absorb or dampen road vibrations transmitted toward the driver through the column, while a typical passenger-side 37a may function properly with a reduced passenger-side tube 25a, making the extension or expanse of a single, uniform tube 16a unnecessary.

Driver-side tube 16a and passenger-side tube 25a abut opposite sides of mid-plate 11a and are aligned end-to-end to laterally span the width of the vehicle body for substantially rigid axial support. Driver-side tube 16a has a plate-end 13 which is welded, fused, otherwise attached to or integrally formed with mid-plate 11a, and a bracket-end 15 which is supported by a driver-side end bracket 14a. Likewise, passenger-side tube 25a has a plate-end 23 which is welded, fused, or otherwise attached to or integrally formed with mid-plate 11a, and a bracket-end 27 which is supported by a passenger-side end bracket 12a. At least one plenum bracket 24a extends radially forward from each of tubes 16a, 25a toward a plenum upper 44 (see FIG. 2) portion of a vehicle body, the brackets 24a being bolted or otherwise attached to the plenum upper for bracing support. At least one of a plurality of instrument panel attachment brackets 17 is positioned at each end of support structure 10a and extends radially forward from its respective end bracket 12a, 14a to attach to an instrument panel retainer (not shown), the retainer being preferably constructed of molded plastic suitable for attachment and housing of the various instruments, gauges, and trim material comprising the final instrument panel.

As stated previously herewithin, a mid-plate 11a divides support structure 10a into a driver-side 31a and a passenger-side 37a. Driver-side 31a is herein depicted in a typical left-hand drive configuration common to North America, although by reversing the configuration a right-hand drive arrangement may be readily accomplished. Driver-side 31a includes a plurality of steering column-related instrument panel supports such as a bolster plate 20 and energy absorbing (E/A) support brackets 22 welded to and extending radially from driver-side tube 16a. Mid-plate 11a of FIG. 1 is preferably an arrow-shape plate as shown to allow a plurality of weldable plate surfaces 45 having various non-orthogonal angles. However, those skilled in the art will recognize that a variety of plate shapes and sizes can be used depending on the specific application. Bracket-end 15 of driver-side tube 16a is inserted into and held captive by a driver-side bracket 14a as shown in FIG. 1. A lift bracket 18 is shown attached to driver-side bracket 14a to provide a lifting point to facilitate lifting and inserting of a complete support structure 10a into the vehicle cabin (not shown).

Passenger-side 37a includes passenger side tube 25a, to which is welded, fused, or otherwise attached a left-hand H-brace 30, right-hand H-brace 28, and center H-brace 26, the three H-braces together defining a center console or section 29. As with bracket-end 15 and end bracket 14a, bracket-end 27 of passenger-side tube 25a is inserted into and supported by a passenger-side end bracket 12a. Lift bracket 18 is shown attached to a passenger-side end bracket 12a and, in conjunction with lift bracket 18 positioned on the driver-side and attached to a driver-side end bracket 14a, provides a lifting point for lifting and inserting a complete support structure 10a into the vehicle cabin (not shown). Passenger-side tube 25a has a plate end 23 which is welded, fused, or otherwise attached to or integrally formed with mid-plate 11a opposite of plate-end 13 of tube 16a. Depending on the weight supported by center section 29, H-braces 26, 28, 30 may be further supported by a brace or gusset 33. In the preferred mode, a passenger-side section 39 is framed by left- and right-hand straps 34, 36, respectively, which are welded or otherwise attached above or at one end to a passenger-side tube 25a, and below or at its other end to a lateral lower tie strap 32. Tie strap 32 extends laterally between and attaches to a right-hand H-brace 28 and the passenger-side end bracket 12a. However, those in the art will recognize that various passenger-side arrangements can easily be formed by varying combinations and configurations of support straps and braces.

Figure 2:
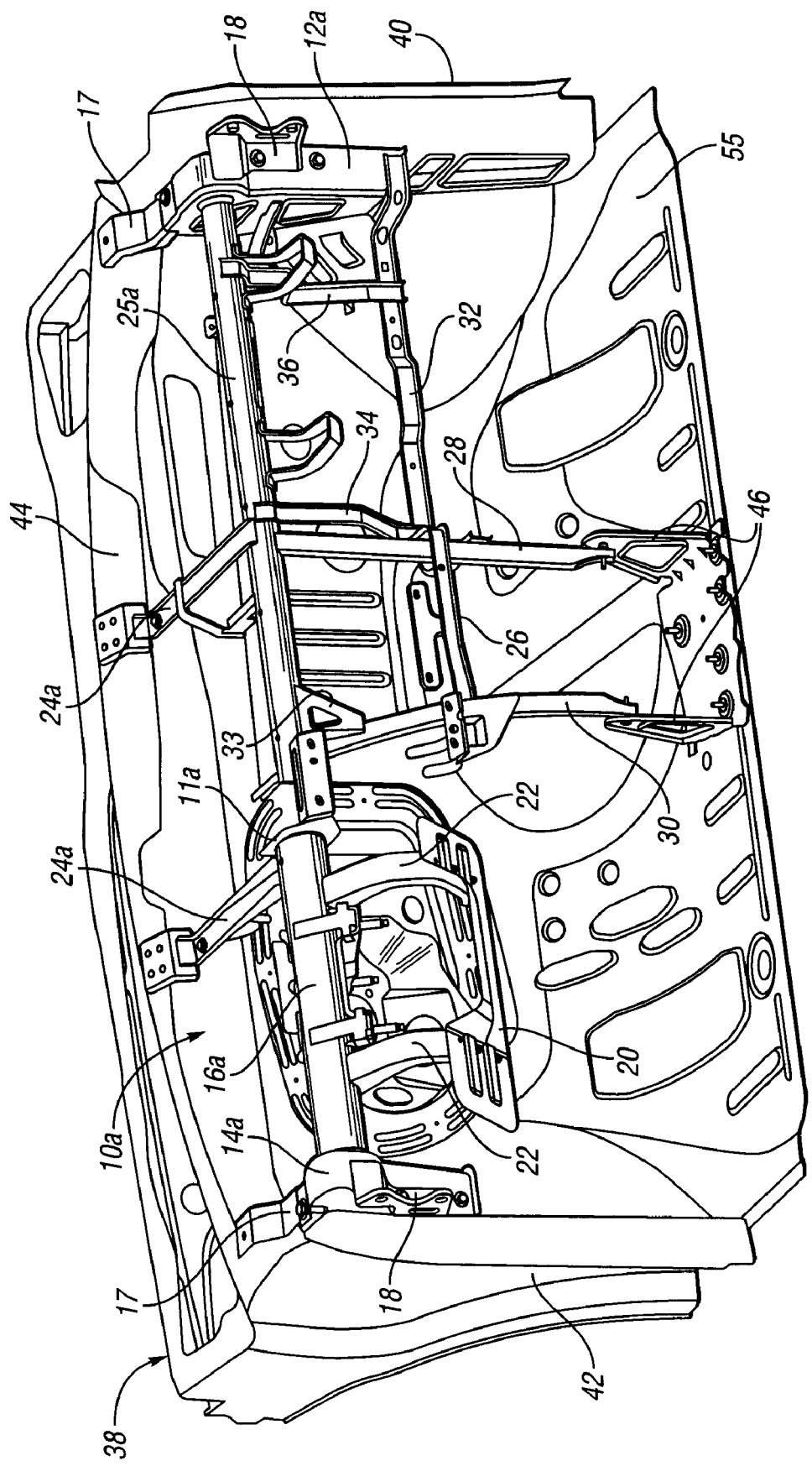
FIG. 2 is a perspective illustration of an instrument panel support structure mounted to a body structure lower assembly.

FIG. 2 shows support structure 10a after it has been inserted into a vehicle cabin (not shown) and bolted or otherwise attached to a vehicle body structure lower 38. For clarity, trim and instrumentation are omitted from FIG. 2. In the preferred mode, a support structure 10a with accompanying retainer, instrumentation, and trim (not shown), is fully assembled outside of the vehicle cabin. The complete support structure 10a then is lifted at lift brackets 18 and inserted into the vehicle, preferably through an open doorway, then bolted or fastened into place on the vehicle body structure lower 38. Alternatively, instruments and other devices, as well as trim material, may be installed and attached after support structure 10a has been installed. Driver-side end bracket 14a is fastened or bolted to a driver-side hinge pillar inner assembly 42 portion of a vehicle body, and passenger-side end bracket 12a is fastened or bolted to a passenger-side hinge pillar inner assembly 40 portion of a vehicle body. H-braces 28, 30 are bolted or fastened to body structure lower 38, preferably to a plurality of floor brackets 46 welded or otherwise rigidly attached to the front of dash 55 of body structure lower 38. Once attached, H-braces 28, 30 provide vertical sag support to structure 10a. After a plurality of plenum bracket attachments 24a are firmly attached to a plenum upper 44, and instrument panel attachment or support brackets 17 are attached to a panel retainer as previously described, the bolts and hinges are trimmed out in an aesthetically pleasing manner, preferably by using a valance panel and end caps constructed of material that matches and blends with the exterior top surfaces of the dashboard.

Figure 3:
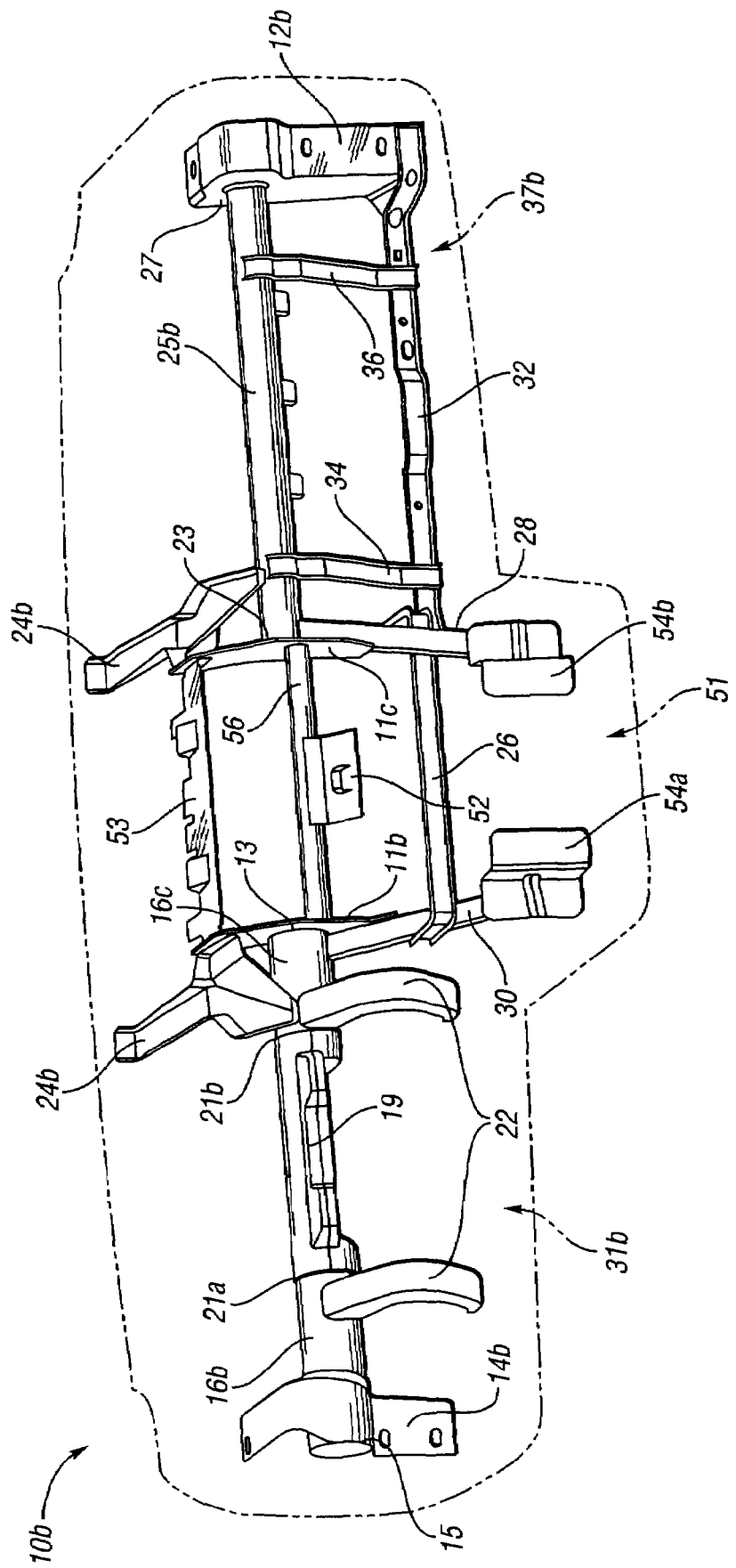
FIG. 3 is a perspective illustration of a second embodiment having two welded plates and a lateral support tube with three segments.

Turning to FIG. 3, which shows a second preferred embodiment, support structure 10b includes a driver-side 31b having first and second driver-side tubes 16b, 16c, a center console area 51 having a center console tube 56, and a passenger-side area 37b having a passenger-side tube 25b. The tubes 16c, 56, 25b are aligned substantially end-to-end and are separated by and attached to a plurality of rigid mid-plates 11b, 11c which are preferably formed of weldable stamped steel. One end of a driver-side tube 16b is inserted into and/or welded to a first end 21a of a steering column attachment bracket 19, while the other end of tube 16b is supported by a driver-side bracket 14b to provide substantially rigid axial and vertical support. A second driver-side tube 16c is inserted into and/or welded to a second end 21b of the attachment bracket. At least one plenum bracket 24b extends radially forward from a second driver-side tube 16c and, along with a plurality of forward-extending instrument panel support brackets 17 (see FIGS. 1 and 2), is bolted or attached to a plenum upper 44 (see FIG. 2) for bracing support. Various other driver-side supports and brackets such as E/A brackets 22 are welded or otherwise attached to tubes 16b, 16c respectively as required by the vehicle design. An H-brace adapter bracket 54a is welded to and positioned at the end of a left-hand H-brace 30, which extends longitudinally downward from and is welded or otherwise attached to a second driver-side tube 16c.

A center-console area 51 is defined by the area between mid-plates 11b, 11c and may support and frame such devices as air vents or outlets, navigation screens, radios/CD/DVD players, and controls for heaters, air conditioning, defrosters, and the like. Area 51 further includes a center-console tube 56, which is welded or attached between mid-plates 11b, 11c and to which is welded or attached a rectangular radio attachment bracket 52. Welded to and spanning the distance between mid-plates 11b, 11c is an upper center retainer bracket 53, which along with center H-brace 26 provides substantially rigid lateral support to center console area 51.

A passenger-side 37b has a passenger-side tube 25b extending laterally from mid-plate 11c to passenger-side end bracket 12b to provide substantially rigid axial and vertical support. At least one plenum bracket 24b extends radially forward from passenger-side tube 25b and is bolted or attached to a plenum upper 44 (see FIG. 2) for bracing support. At least one forward-extending instrument panel support bracket 17 (see FIGS. 1 and 2) may be attached to passenger-side end bracket 12b to attach to an instrument panel retainer (not shown), as previously described herewithin. As in FIG. 1, passenger-side 37b may be supported by a variety of lateral and horizontal support brackets or braces, such as straps 32, 34, 36. An H-brace adapter bracket 54b is welded to and disposed at the end of a left-hand H-brace 28 which extends downward from and is welded or otherwise attached to tube 25b. Center H-brace 26 wraps around and/or is welded to H-braces 28, 30 to provide lateral bracing support to center-console area 51, as well as additional weldable surface area.

While the best modes for carrying out the invention have been described in detail, those familiar with the art to which this invention relates will recognize various alternative designs and embodiments for practicing the invention within the scope of the appended claims.

The invention claimed is:

1. A vehicle instrument panel support structure comprising:
   a first lateral support tube having a plurality of support brackets extending therefrom;
   a second lateral support tube having a plurality of support brackets extending therefrom; and
   a plate, wherein each of said first and second lateral support tubes have a pair of ends, are aligned end-to-end, and are operatively connected to said plate at a respective one of said ends, said plate dividing said support structure into two segments.

2. The structure of claim 1, wherein said first lateral support tube is cylindrical and has a first diameter and said second lateral support tube is cylindrical and has a second diameter different from said first diameter.

3. The structure of claim 1, wherein said first lateral support tube has a first gauge thickness and said second lateral support tube has a second gauge thickness different from said first gauge thickness.

4. The structure of claim 1, including a vehicle body, wherein said first lateral support tube is operatively connected at one end to at least one of said support brackets, said at least one of said support brackets being operatively connected to said vehicle body for support of said first lateral support tube.

5. The structure of claim 1, wherein at least one of said support brackets includes a plenum support bracket extending radially from at least one of said support tubes and connecting to a vehicle plenum upper for bracing support of said instrument panel support structure.

6. The structure of claim 5, including vehicle body hinge pillar portions, and further including first and second end brackets operatively connected to said vehicle body hinge pillar portions, wherein said first lateral support tube has an end operatively connected to said first end bracket and said second lateral support tube has another end operatively connected to said second end bracket.

7. An instrument panel support structure comprising:
   a plurality of lateral support tubes each having a pair of ends, said plurality of lateral support tubes including a first, a second, and a third lateral support tube;
   a first plurality of support brackets, at least one of which extends radially outward from said first lateral support tube to at least partially define an instrument panel driver-side area;
   a second plurality of support brackets, at least one of which extends radially outward from said second lateral support tube to at least partially define an instrument panel center-console area; and
   a third plurality of support brackets, at least one of which extends radially outward from said third lateral support tube to at least partially define an instrument panel passenger-side area;
   wherein said first and second lateral support tubes are positioned end-to-end with respect to one other and are operatively connected at a respective one of said pair of ends to opposite sides of a first common plate, and wherein said second and third lateral support tubes are positioned end-to-end with respect to one another and are operatively connected at a respective one of said pair of ends to opposite sides of a second common plate.

8. The structure of claim 7, wherein at least two of said first, second, and third lateral support tubes have different diameters suitable to respective forces born on the respective areas defined by said at least two of said first, second, and third lateral support tubes.

9. The structure of claim 7, wherein at least two of said first, second, and third lateral support tubes have different gauge thicknesses suitable to respective forces born on respective areas defined by said at least two of said first, second, and third lateral support tubes.

10. The structure of claim 7, wherein said first plurality of support brackets includes energy absorbing brackets and a driver bolster plate, said bolster plate being operatively connected to said energy-absorbing brackets.

11. A vehicle body assembly including a first and second hinge pillar and further comprising:
    an instrument panel support structure having a plurality of lateral support tubes and a plurality of support brackets extending radially outward therefrom; and
    at least one plate;
    wherein a pair of said plurality of lateral support tubes are aligned end-to-end with respect to one another and are operatively connected respectively to said first and second hinge pillars to provide substantially rigid lateral support, and
    wherein said at least one plate is welded to an end of each of said plurality of lateral support tubes to thereby divide said instrument panel support structure into at least two segments.

12. The vehicle body assembly of claim 11, wherein said plurality of lateral support tubes comprises a first lateral support tube at least partially defining an instrument panel driver-side area, and a second lateral support tube at least partially defining an instrument panel passenger-side area, said first and second lateral support tubes having at least one of disparate diameters and disparate gauge thicknesses.

13. The vehicle body assembly of claim 12, wherein said plurality of support brackets at least partially defines said driver-side area and said passenger-side area.

14. The vehicle body assembly of claim 11, wherein said plurality of support brackets includes a driver bolster plate operatively connected to a plurality of energy-absorbing brackets, said brackets being operatively connected to and extending radially outward from said first lateral support tube.

15. The vehicle body assembly of claim 11, including a plenum upper assembly wherein at least one of said plurality of support brackets is a plenum bracket extending radially from at least one of said support tubes and operatively connected to said plenum upper assembly for bracing support of said structure.

16. The vehicle body assembly of claim 11, wherein said plate is arrow-shaped and has a plurality of non-orthogonal angles forming a plurality of weldable surfaces.

* * * * *